(12) United States Patent
Takagi et al.

(10) Patent No.: US 6,776,436 B2
(45) Date of Patent: Aug. 17, 2004

(54) VEHICULAR OCCUPANT RESTRAINT SYSTEM AND METHOD

(75) Inventors: Akira Takagi, Nagoya (JP); Masahiro Taguchi, Hazu-gun (JP); Tomoyuki Goto, Anjo (JP); Hironori Sato, Nishio (JP); Masayuki Imanishi, Okazaki (JP)

(73) Assignees: Nippon Soken, Aichi-ken (JP); Denso Corporation, Kariya (JP)

( * ) Notice: Subject to any disclaimer, the term of this patent is extended or adjusted under 35 U.S.C. 154(b) by 0 days.

(21) Appl. No.: 10/270,655

(22) Filed: Oct. 16, 2002

(65) Prior Publication Data

US 2003/0080543 A1 May 1, 2003

(30) Foreign Application Priority Data

Nov. 1, 2001 (JP) ........................................ 2001-336497

(51) Int. Cl.[7] ............................................... B60R 21/26
(52) U.S. Cl. ...................... 280/735; 701/300; 701/301; 342/72
(58) Field of Search ................................ 280/739, 735; 180/167, 168, 169; 201/96, 300, 301; 342/72

(56) References Cited

U.S. PATENT DOCUMENTS

| | | | | |
|---|---|---|---|---|
| 5,285,188 A | * | 2/1994 | Yoshida | 340/436 |
| 5,314,037 A | * | 5/1994 | Shaw et al. | 180/169 |
| 5,377,108 A | * | 12/1994 | Nishio | 701/45 |
| 5,626,359 A | * | 5/1997 | Steffens et al. | 280/735 |
| 5,699,057 A | * | 12/1997 | Ikeda et al. | 340/937 |
| 5,959,552 A | * | 9/1999 | Cho | 340/903 |
| 5,963,549 A | * | 10/1999 | Perkins et al. | 370/342 |
| 5,979,586 A | * | 11/1999 | Farmer et al. | 180/274 |
| 6,087,928 A | * | 7/2000 | Kleinberg et al. | 340/436 |
| 6,097,332 A | * | 8/2000 | Crosby, II | 342/72 |
| 6,263,033 B1 | * | 7/2001 | Hansen | 375/370 |
| 6,278,360 B1 | * | 8/2001 | Yanagi | 340/436 |
| 6,408,237 B1 | * | 6/2002 | Cho | 701/45 |
| 6,598,900 B2 | * | 7/2003 | Stanley et al. | 280/735 |
| 6,616,186 B1 | * | 9/2003 | Midorikawa et al. | 280/801.1 |
| 6,626,463 B1 | * | 9/2003 | Arima et al. | 280/806 |

FOREIGN PATENT DOCUMENTS

JP  A-2001-30870  2/2001

* cited by examiner

*Primary Examiner*—Paul N. Dickson
*Assistant Examiner*—Toan To
(74) *Attorney, Agent, or Firm*—Posz & Bethards, PLC

(57) ABSTRACT

A vehicular occupant restraint system includes a distance sensor, an electromagnetic wave radiation-type occupant sensor, a controller, and an airbag drive circuit. When the controller predicts a collision and determines it is unavoidable based on the output of the distance sensor, the controller sends an instruction signal to the occupant sensor to determine the seating condition of an occupant. Then, the airbag drive circuit performs an airbag deployment control in accordance with the determined seating condition. This system thus reduces power consumption and electromagnetic wave radiation of the occupant sensor.

7 Claims, 2 Drawing Sheets

VEHICULAR OCCUPANT RESTRAINT SYSTEM AND METHOD

CROSS REFERENCE TO RELATED APPLICATION

This application is based on and incorporates herein by reference Japanese Patent Application No. 2001-336497 filed on Nov. 1, 2001.

FIELD OF THE INVENTION

The present invention relates to vehicular occupant restraint system and method.

BACKGROUND OF THE INVENTION

In the vehicle airbag system, the airbag deployment needs to be started immediately after a collision, and the determination of the seating condition of occupants needs to be made before the start of airbag deployment. The time allowed for the determination is so short that it is difficult to determine the seating condition with accuracy within that time.

Therefore, the seating condition is periodically monitored and determined while the vehicle is traveling. The airbag deployment control is performed based on the latest condition determined immediately before a collision.

If the interval of the periodic determination is long, the condition may not match an actual condition at the collision. Therefore, a proper airbag deployment control may not be performed. Although this problem may be solved by shortening the interval, technical and economic burdens, such as unnecessary battery power consumption for the periodic monitoring and determination, increase.

Furthermore, an electromagnetic wave sensor may be used for the occupant sensor. The electromagnetic wave sensor irradiates an occupant with short wavelength electromagnetic waves such as millimeter waves or microwaves. It determines the seating condition based on how the waves are reflected off the occupant. In this instance, the influence of the electromagnetic wave irradiation on human body needs to be considered.

SUMMARY OF THE INVENTION

The present invention therefore has an objective to provide a vehicular occupant restraint system that performs appropriate occupant protecting operations based on the latest and accurate determination of seating condition of the occupant.

The present invention has another objective to provide a vehicular occupant restraint method for determining a current seating condition with accuracy and performing an appropriate occupant protecting operations based on the seating condition.

In the occupant restraint system of the present invention, a probability of occurrence of a potential collision is determined. When the probability is high, seating conditions of vehicle occupants are determined. Then, occupant restraint operations are performed based on the determined seating condition. Therefore, the seating condition determination can be performed in advance of the deployment of an airbag without periodic monitoring, and a current seating condition can be accurately determined. Thus, battery power consumption by the airbag system can be reduced.

Preferably, an occupant sensor emits electromagnetic waves only after the potential collision is predicted in this system. Therefore, the electromagnetic wave irradiation as well as power consumption can be reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1:
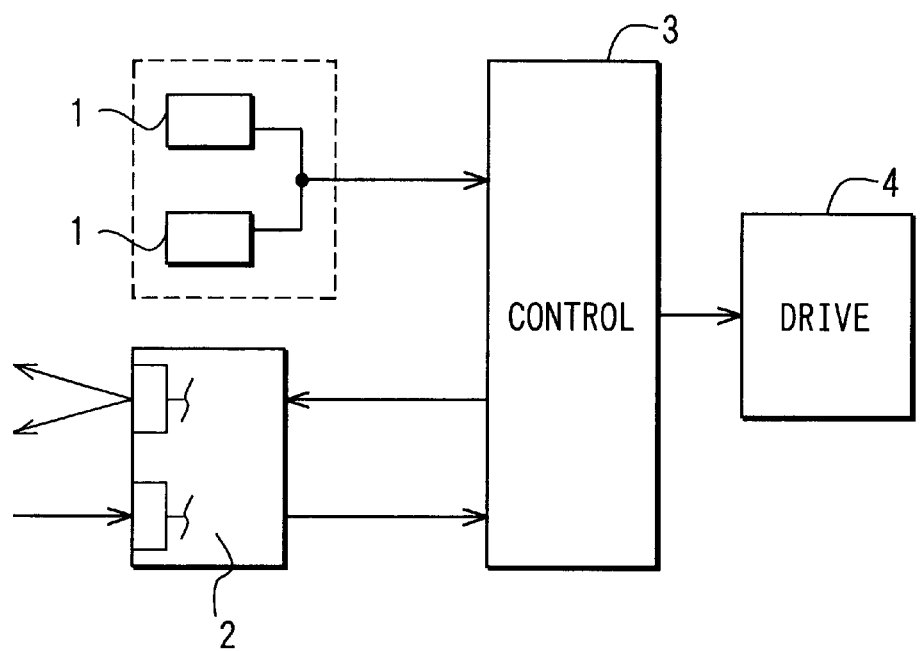
FIG. 1 is a block diagram showing a vehicular occupant restraint system according to the first embodiment of the present invention.

Referring to FIG. 1, a vehicular occupant restraint system includes distance sensors 1, an occupant sensor 2, a controller 3, and an airbag drive circuit 4.

The distance sensors 1 are fixed to the front of a vehicle. They remotely detect an object ahead of a vehicle by measuring a distance between the vehicle and the object. The occupant sensor 2 is fixed to an upper portion of front windshield. It acquires data on a seating condition of a vehicle occupant by taking images of seat areas. The seating condition includes a position, a physical appearance, and posture of the occupant in the seat. The controller 3 predicts a potential collision based on outputs of the distance sensors 1. When a probability of occurrence of the potential collision is higher than a predetermined value, it sends an instruction signal to the occupant sensor 2 for the data acquisition. Then, the controller 3 determines the seating condition based on the data. The drive circuit 4 performs a deployment control of an airbag (not shown) in accordance with the determined seating condition.

Figure 2:
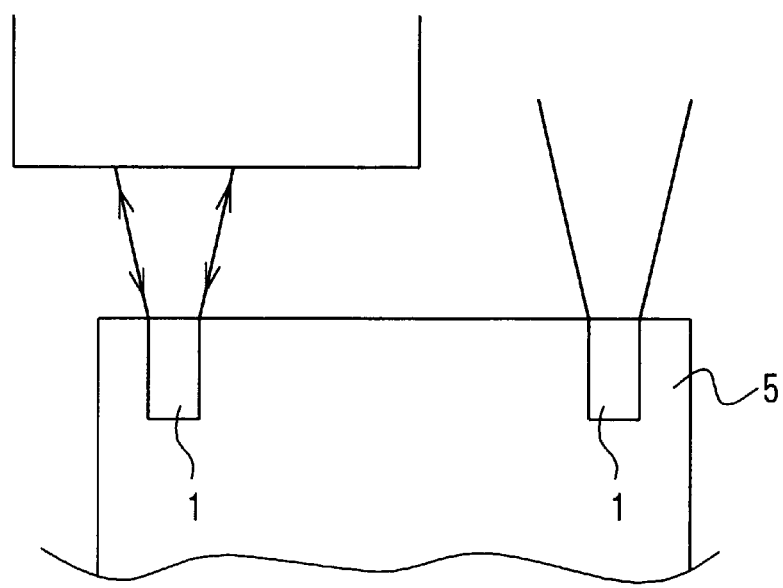
FIG. 2 is a schematic diagram showing distance sensors of FIG. 1.

Referring to FIG. 2, the distance sensors 1 are fixed to the right end and the left end on the front of a vehicle chassis 5, respectively. The distance sensors 1 emit ultrasonic beams with a certain spreading angle. They measure the amount of time between when the beam is emitted and when the reflected beam is received.

The controller 3 calculates a rate of decrease of distance for each distance data acquired by the distance sensors 1. It calculates the time to the point that the distance becomes zero. Then, it determines whether the collision is avoidable based on the time and the speed of the vehicle. If the collision is unavoidable, it sends out a collision prediction signal. Immediately after that, it sends an instruction signal to the occupant sensor 2 to acquire data on the current seating condition.

Figure 3:
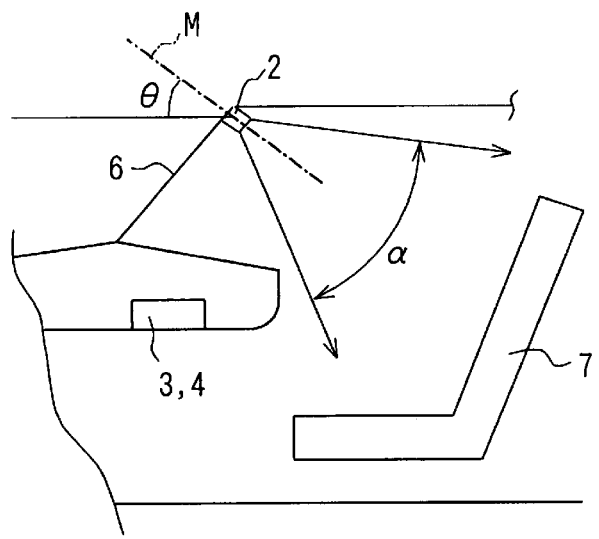
FIG. 3 is a schematic diagram showing an electromagnetic-wave occupant sensor of FIG. 1.

The occupant sensor 2 is fixed to an upper portion of front windshield 6 as shown in FIG. 3. It emits a short-pulse electromagnetic beam with a predetermined spreading angle. In a constant emitting cycle for N times toward a rear portion of the vehicle including a seat 7. The short-pulse electromagnetic beam can be a microwave or a millimeter wave.

The occupant sensor 2 receives a beam reflected off a seat or an occupant. It measures the time between when the beam is emitted and when the reflected beam is received. Then, it calculates the distance to the seat or the occupant in the compartment from the measured time.

In the occupant sensor 2, a vibration voltage of an oscillator is amplified by a power amplifying circuit and outputted as a transmitting wave voltage. The transmitting wave voltage is applied to a transmitting antenna, and an electromagnetic wave is emitted from the antenna to the rear compartment of the vehicle. The power amplifying circuit continues applying the transmitting wave voltage to the antenna while a control pulse signal is being inputted. The control pulse signal has a pulse cycle equal to an electromagnetic wave emitting cycle, and a pulse width corresponding to the time of the electromagnetic wave emission.

A receiving antenna is provided near the transmitting antenna. A receiving wave voltage at the receiving antenna is applied to a mixer. The transmitting wave voltage is also applied to the mixer via a variable delay circuit. The receiving wave voltage and the delayed transmitting wave voltage are mixed by the mixer and outputted as a mixed voltage.

A delay time control signal is outputted from a control circuit included in the occupant sensor 2 and inputted to the variable delay circuit. By this control signal, a delay time of the variable delay circuit is increased every application of transmitting wave voltage. The transmitting wave voltage inputted from the variable delay circuit to the mixer is delayed by a minimum predetermined delay time after the first emitting cycle. After the Nth emitting cycle, the transmitting wave voltage is delayed by a maximum predetermined delay time.

When the delay between the transmitting wave voltage and the receiving wave voltage matches with the delay between the transmitting wave voltage and the delayed transmitting wave voltage, the mixer outputs a voltage with large amplitude.

Large amplitude voltage is extracted, utilizing a wave-shaping circuit such as a comparator, and rectified to a pulse signal. By measuring the time between the start of wave transmission and a leading edge of the pulse, the distance between the sensor 2 and the object is determined. For instance, the mixed voltage is rectified and binarized by a predetermined reference voltage. The binarized voltage is outputted as a receiving pulse voltage. A time between a leading edge of the first pulse of the receiving pulse voltage and a leading edge of the transmitting wave voltage inputted immediately before the receiving pulse voltage is measured. Then, the distance between the occupant sensor 2 and an object is calculated from the measured time.

In this embodiment, the occupant sensor 2 has only one set of transmitting antenna and receiving antenna. Therefore, further calculation is necessary to determine a distance between the sensor and the occupant in the front-rear direction. The triangular method is used for this calculation. It is assumed the distance determined by the first calculation is between the points on the centerline M of FIG. 3. The distance in the front-to-rear direction is calculated from the distance determined by the first calculation with the triangular method. The calculations are performed by a dedicated circuit included in the occupant sensor 2. However, some calculation may be performed by the controller 3 with a software process.

Figure 4:
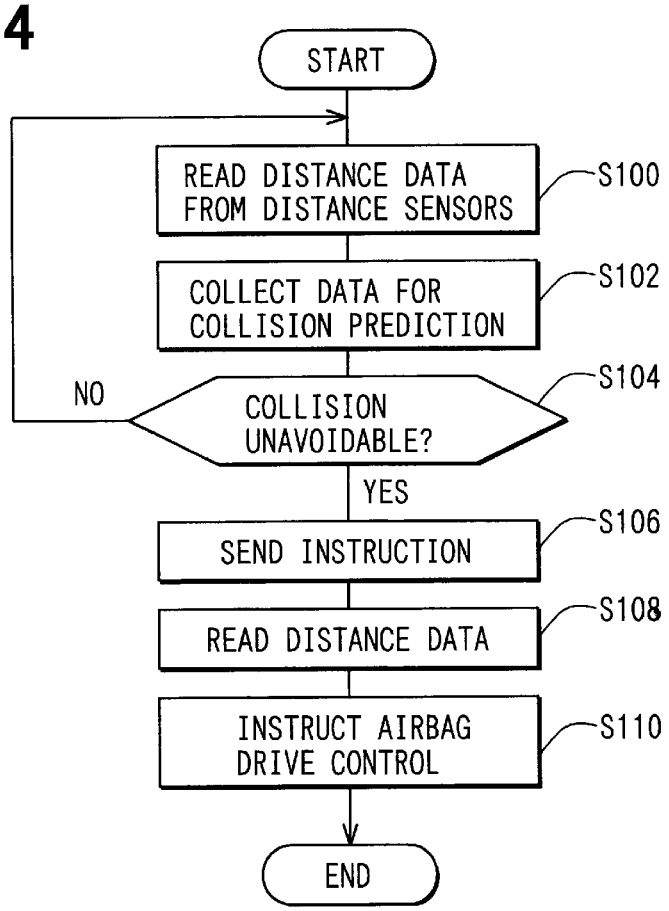
FIG. 4 is a flowchart showing a process of occupant restraining operation.

An occupant restraint control is performed as shown in FIG. 4. The controller 3 reads data from a pair of distance sensors 1 in step S100. The controller 3 calculates the rate of decrease of distance for each distance data based on the time to the point that the distance becomes zero and the speed of the vehicle in step S102. Then, it determines whether the collision is avoidable in step S104. If the collision is avoidable, it repeats steps S100 and S102. If the collision is unavoidable, it sends an instruction signal to the occupant sensor 2 for distance data acquisition in step S106. After the distance data is acquired, it reads the distance data in step S108. It selects an appropriate airbag drive mode among the pre-programmed modes and sends the mode data to the airbag drive circuit 4 as an airbag drive signal in step S110. The airbag drive circuit 4 performs an airbag deployment control (not shown) based on the received signal.

The present invention should not be limited to the embodiment previously discussed and shown in the figures, but may be implemented in various ways without departing from the spirit of the invention.

An electromagnetic beam may be used, instead of the ultrasonic beam, for the distance sensors 1. Another alternative is a one-dimensional or two-dimensional image sensor. Either of the image sensors may be used to acquire images of the object ahead of the vehicle. Then, a trigonometric distance measurement is performed to determine the distance to the object utilizing the images. Furthermore, any known sensing device can be used for the distance sensors 1.

The occupant sensor 2 can be configured in other ways. For example, the sensor 2 may include several sets of the transmitting antenna and the receiving antenna for each divided scanning area. The sensor 2 irradiates the divided scanning area with a narrow beam. The transmitting antenna and the receiving antenna may be integrated.

The sensor 2 may include only one receiving antenna for the several transmitting antenna. The transmitting antenna can be either mechanically controlled or electronically controlled for scanning. For electronic control, a phased array antenna may be used.

What is claimed is:

1. A vehicular occupant restraint system, comprising:
   an object detecting means that detects an object near a vehicle;
   a collision predicting means that predicts a potential collision based on the object detection and reports the potential collision if a probability of occurrence of the potential collision is high;
   a seating condition determining means that monitors and determines a seating condition of vehicle occupant;
   a seating condition detecting control means that controls the determining means to operate only immediately after the potential collision is reported thereby determining the seating condition; and
   an occupant restraint means that performs an occupant restraint control based on the collision prediction and the seating condition.

2. The vehicular occupant restraint system as in claim 1, wherein:
   the determining means includes an electromagnetic wave occupant sensor that emits an electromagnetic wave toward a seat; and
   the control means sends an instruction to the occupant sensor to emit the electromagnetic wave only after receiving the collision prediction.

3. The vehicular occupant restraint system as in claim 2, wherein the electromagnetic wave occupant sensor emits the electromagnetic wave, a wave length of which is in a range of any one of microwave length and millimeter wave length.

4. The vehicular occupant restraint system as in claim 1, wherein the occupant restraint means includes an airbag and an airbag drive circuit that performs airbag deployment control based on the collision prediction and the seating condition.

5. A vehicular occupant restraint method comprising:

detecting an object near a vehicle while the vehicle is in motion;

determining a probability of the vehicle colliding with the object based on an output of the detecting step;

outputting a collision prediction signal if the probability of the collision is higher than a predetermined value;

monitoring a seating condition of a vehicle occupant only after the collision prediction signal is outputted; and performing an occupant restraint operation based on the seating condition.

6. The vehicular occupant restraint method as in claim 5, wherein the occupant restraint operation performing step performs an airbag deployment.

7. The vehicular occupant restraint method as in claim 5, wherein:

the seating condition monitoring step drives an occupant sensor that irradiates a vehicle compartment with an electromagnetic wave to monitor the seating condition.

* * * * *